Oct. 14, 1924.
C. B. KIRKHAM
INTERNAL COMBUSTION ENGINE
Filed May 13, 1918      7 Sheets-Sheet 1
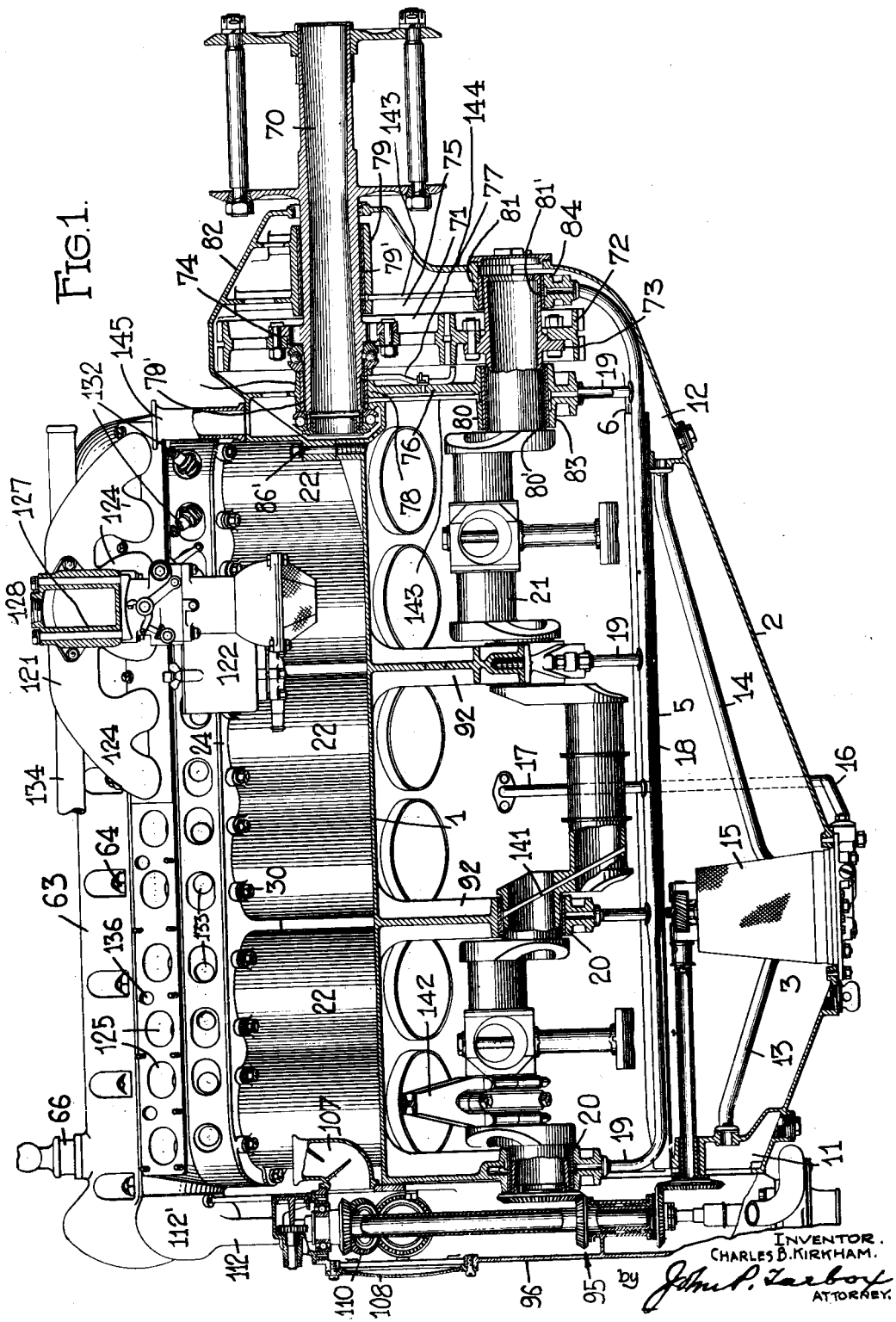

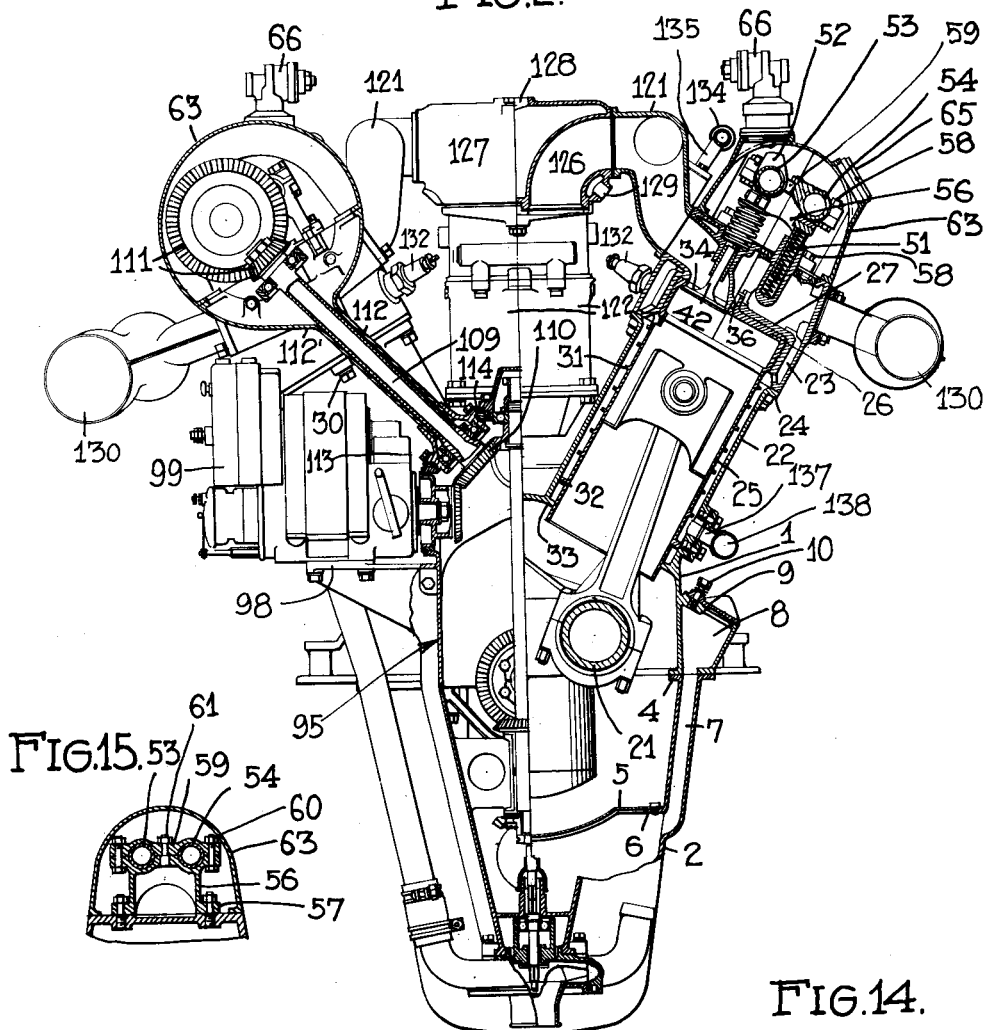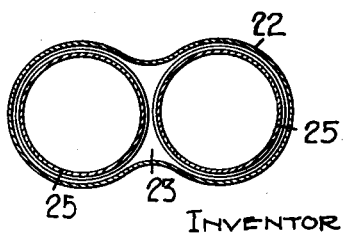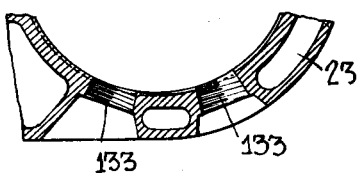

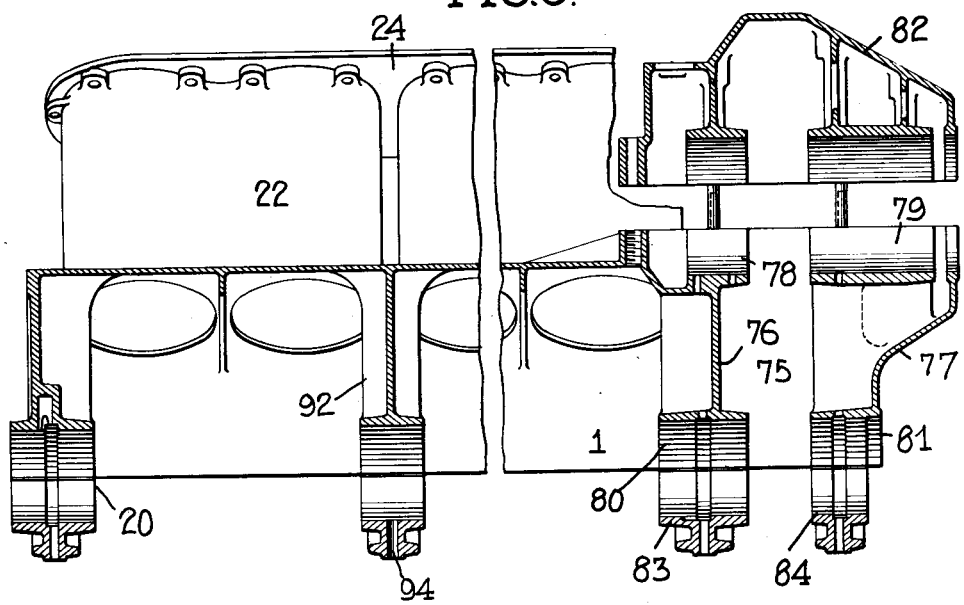
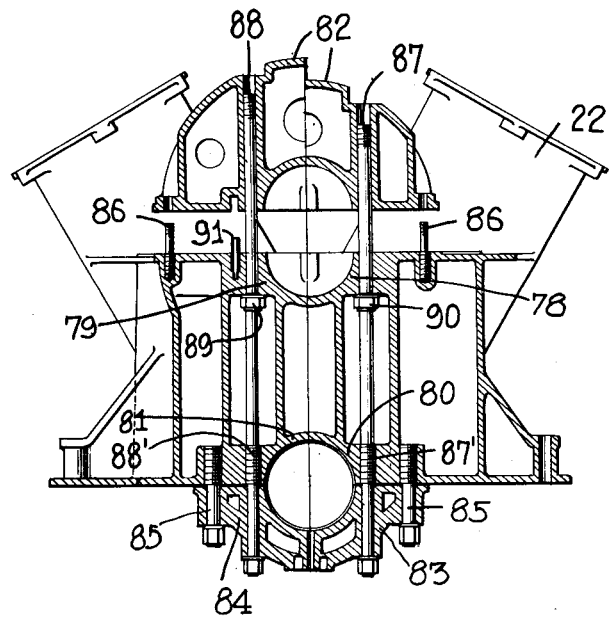
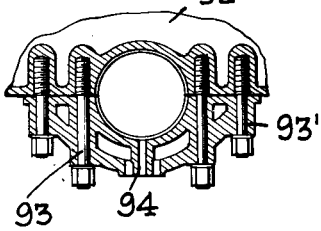

Oct. 14, 1924.

C. B. KIRKHAM 1,511,672

INTERNAL COMBUSTION ENGINE

Filed May 13, 1918  7 Sheets-Sheet 4

INVENTOR
CHARLES B. KIRKHAM.
by John P. Tarbox
ATTORNEY.

Oct. 14, 1924.

C. B. KIRKHAM 1,511,672

INTERNAL COMBUSTION ENGINE

Filed May 13, 1918　　7 Sheets-Sheet 5

INVENTOR.
CHARLES B. KIRKHAM.
by John P. Tarbox
ATTORNEY.

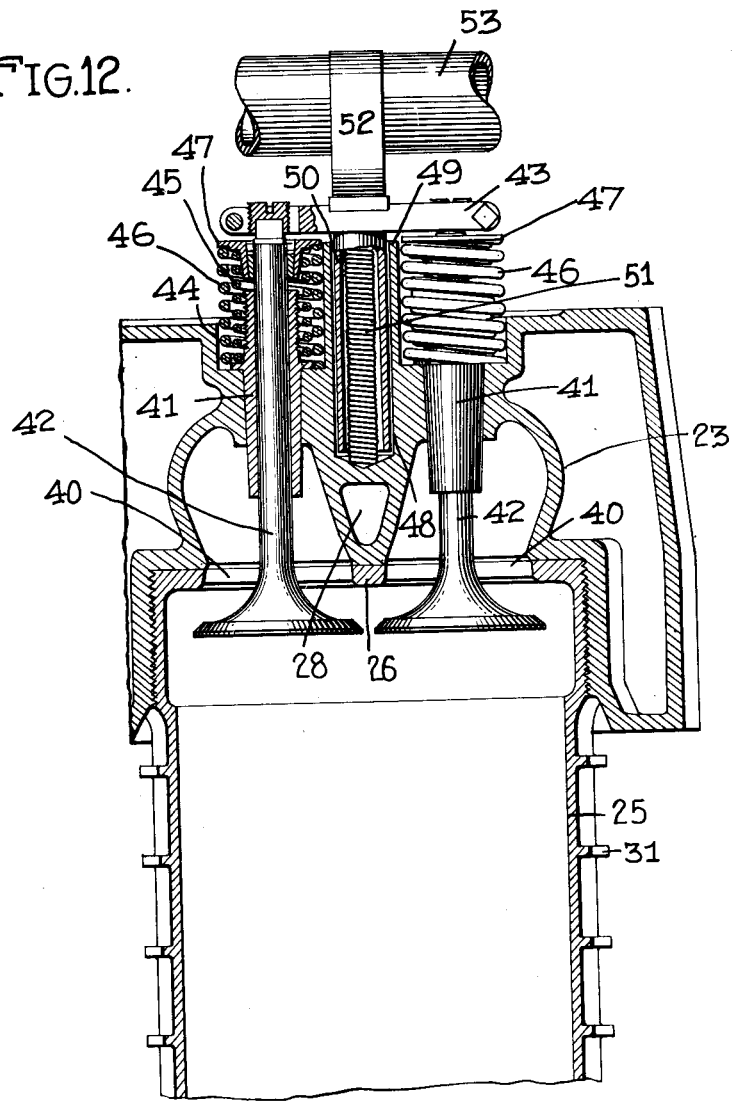

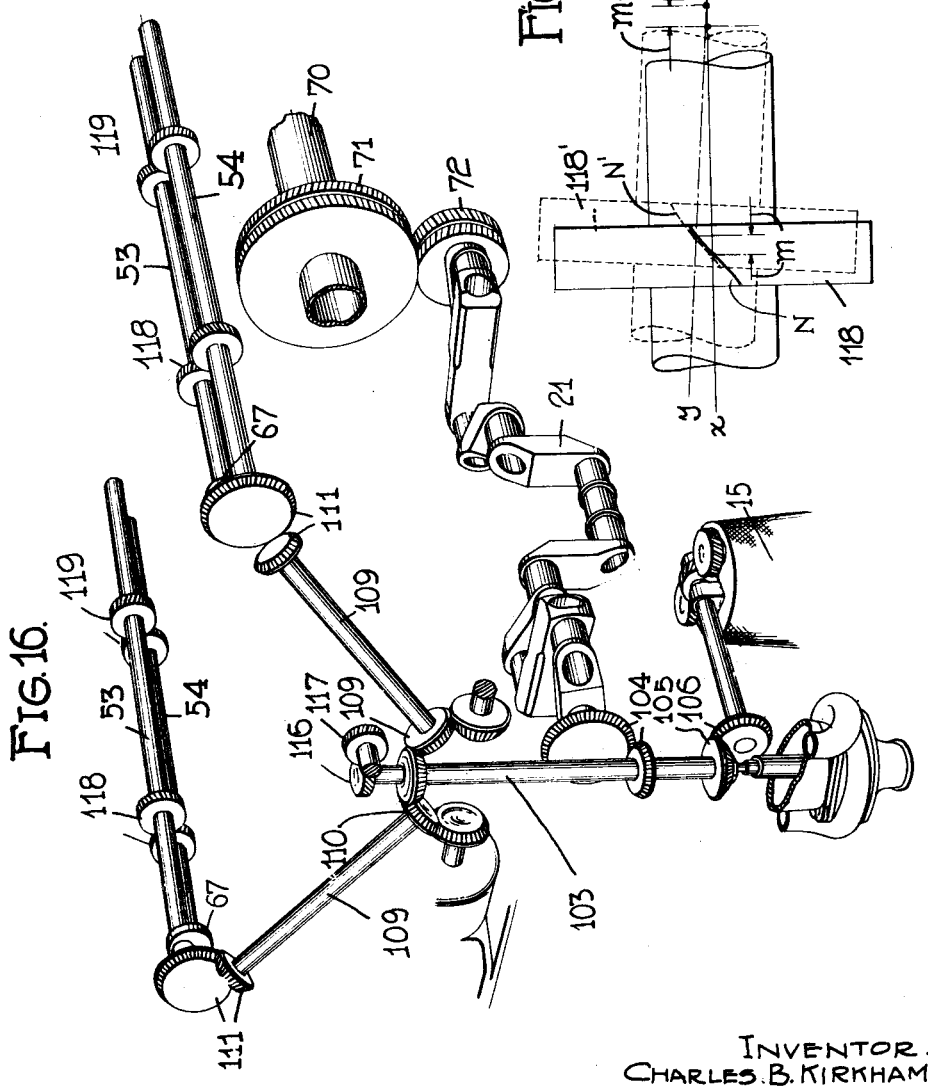

UNITED STATES PATENT OFFICE.

CHARLES B. KIRKHAM, OF GARDEN CITY, NEW YORK, ASSIGNOR, BY MESNE ASSIGNMENTS, TO CURTISS AEROPLANE AND MOTOR COMPANY, INC., A CORPORATION OF NEW YORK.

INTERNAL-COMBUSTION ENGINE.

Application filed May 13, 1918. Serial No. 234,235.

*To all whom it may concern:*

Be it known that I, CHARLES B. KIRKHAM, a citizen of the United States, residing at Garden City, L. I., in the county of Nassau and State of New York, have invented certain new and useful Improvements in Internal-Combustion Engines, of which the following is a specification.

This invention relates to internal combustion engines and particularly aeronautical motors of the type set forth in my application Serial No. 181,238, filed July 18, 1917.

The object of my invention is a motor which possesses to a marked degree all of those characteristics essential in a successful aeronautical motor, i. e. maximum power per unit weight, maximum efficiency, pronounced reliability, and substantial durability.

An important feature of the present motor (also characteristic of the motor of the above mentioned application) is the anchoring of the cylinders securely in their operative position independently of the water jacket casings whereby all mechanical connections between the cylinders and the jackets are eliminated and the cylinder bodies are unaffected by the expansion and contraction of the jackets. To this end I so assemble the parts and attach the cylinders directly to the valve cage in such manner that they are maintained in spaced relation to the jacket casings throughout the length of the piston travel. By this construction and arrangement there is no tendency for the cylinder bodies to become distorted from their cylindrical shape by the radial and longitudinal contraction and expansion of the jackets. This is especially important in the present motor which embodies aluminum or aluminum alloy jackets whose coefficient of expansion is substantially greater than that of the steel forgings of which the cylinder bodies are made.

More specifically the cylinder bodies or liners are attached thru their heads directly to a valve cage member, with their lower ends freely suspended therefrom and immersed in the cooling medium. The bodies are thereby free from the usual longitudinal strains set up by the explosions of the gaseous charges, and the transfer of heat from the interior of the cylinder takes place directly to the cooling fluid through the cylinder wall, no insulating mechanical connection being encountered. Moreover the dimensions of the cylinder head or combustion chamber may be varied (expanded) without necessitating a corresponding variation of the cylinder bore, or the combustion chamber walls may be as thick as desired to give the required rigidity, without a corresponding increase in the thickness of the walls throughout the piston travel.

The water jackets may be attached to the crank case in any manner desired but are preferably formed integrally therewith to enhance the strength and rigidity. My improvements are illustrated as embodied in a V-motor but certain features thereof are equally applicable to other types. The cylinder liners are anchored in pockets provided in the valve cage, and each liner has an integral head formed slightly convex outwardly, whereby when the cylinder is driven home the convex head is flattened out and securely held against the bottom of the pocket. To further ensure a tight non-insulating joint between the head and bottom of the pocket, each cylinder head is preferably provided with a tightening stud which enters a corresponding opening through the valve cage wall and receives a clamping nut.

Another important feature, is the formation (in a geared down motor) of the reduction gear chamber integrally with the crank case, whereby the upper bearings of the crank shaft and the lower bearings of the propeller are formed in one piece and the alignment of the propeller and crank shafts is assured at all times. Certain other features reside in the reduction gear drive and mounting and in the driving and actuating mechanism for the overhead valves, as will hereinafter appear more fully.

Other features of my invention will be apparent upon an inspection of the accombodiment thereof wherein;

Fig. 1 is a longitudinal sectional view of my motor showing certain of the parts in elevation, Fig. 2 is an end view thereof showing certain of the parts in section, Fig. 3 is a sectional view thru the crank case showing the assembly thereof, Fig. 4 is a sectional view on the line 4—4 of Fig. 3.

Fig. 5 is a sectional view thru one of the crank shaft bearings,

Figure 6:
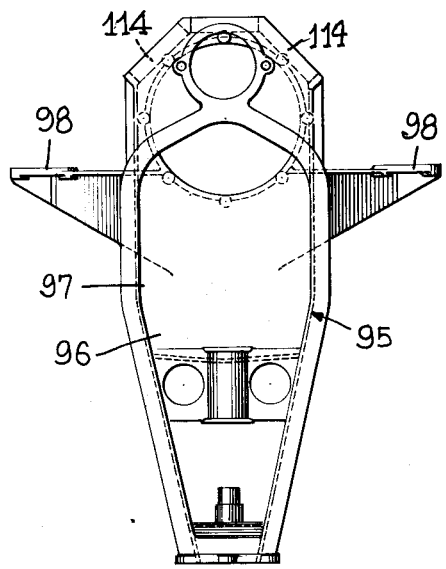
Fig. 6 is a view of the end closing plate or housing for the crank case.
Figure 7:
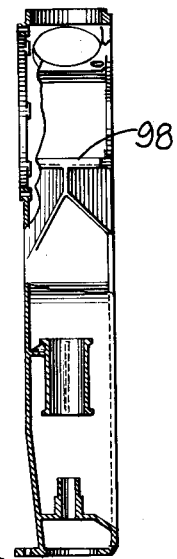
Fig. 7 is a sectional view thereof.
Figure 8:
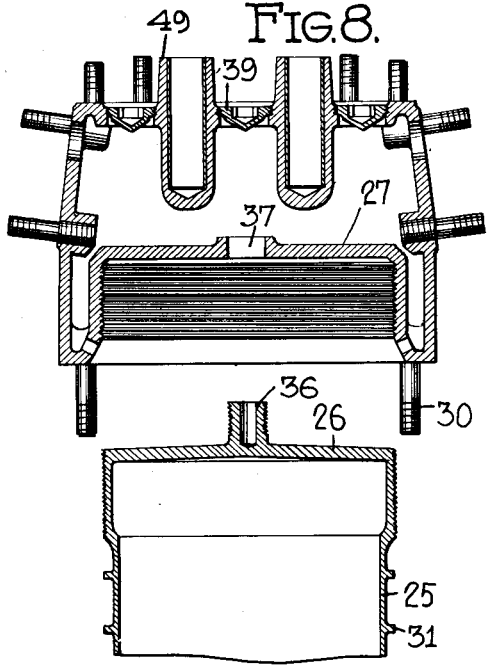
Figure 9:
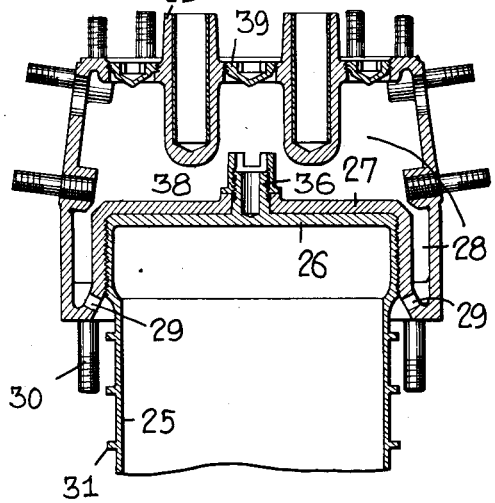
Figure 10:
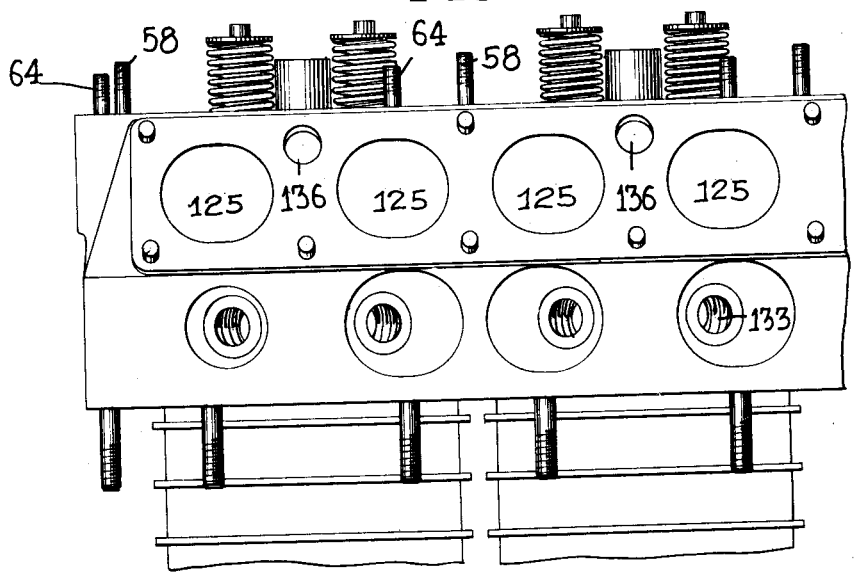
Figure 11:
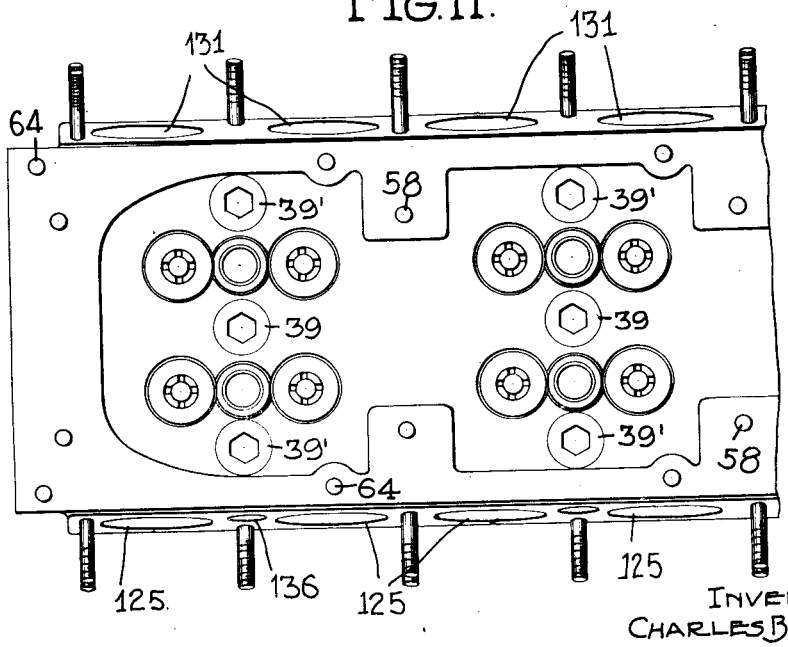

Fig. 8 is a sectional view thru the valve cage and the cylinder illustrating the assembly thereof, Fig. 9 is a view similar to Fig. 8 showing the parts in assembled position, Fig. 10 is a side view of the valve cage and cylinders, Fig. 11 is a plan view thereof, Fig. 12 is a sectional view thru a pair of intake valves and operating mechanism, Fig. 13 is a detailed sectional view thru the valve cage illustrating the spark plug passages, Fig. 14 is a transverse sectional view thru the cylinders and water jackets, Fig. 15 is a sectional view thru the cam shafts and bearings, Fig. 16 is a more or less diagrammatic view of the system of power transmission from the crank shaft, and Fig. 17 is a diagrammatic view illustrating the operation of the intermeshing cam shafts.

Referring to the drawings wherein like numerals refer to similar parts throughout, I have illustrated my invention as embodied in a motor of the V type having two banks of cylinders disposed at an angle to each other in the usual manner.

The crank case comprises an upper half 1 and a lower half 2, the lower half comprising an oil sump 3 located in the lower part thereof, formed by the downwardly sloping bottom end walls thereof as indicated in Fig. 1. The lower half 3 and the upper half 1 are provided with complementary shoulders or flanges 4 whereby the two halves may be securely fastened together. A drip pan 5 separates the crank shaft and operating parts from the oil sump and is carried by a flange or shelf 6 formed integrally on the interior of the lower half, the pan 5 being suitably fixed thereto as for instance by the screw bolts indicated in Fig. 2. The lower half 2 of the crank case is also provided on one side thereof with an integrally formed intake passage 7, the latter being in communication with an integrally formed chamber 8 on the upper half of the crank case and leading downwardly to the oil sump beneath the drip pan 5 as indicated in Fig. 2. The chamber 8 which is formed on the exterior of the side of the upper half may be provided with a suitable cover plate 9, the latter being securely held upon its seat by means of a bolt and spring 10. By means of this intake chamber 8 and the communicating passage 7 lubricant may be supplied to the oil sump 3 when it is necessary to replenish the supply. The lower half of the crank case is also provided with the collecting chambers 11 and 12 at either end of the drip pan 5 at the ends of which is collected the used lubricant as it drains downwardly from the moving parts of the motor. From these collection chambers the used lubricant is drawn downwardly thru the communicating ducts 13 and 14 by means of a scavenging pump 15 and forced therefrom into the oil sump 3. The pump 15 also embodies in addition to the scavenging pump a force pump (this pump being set forth and claimed in a co-pending application) which forces the lubricant from the sump 3 out thru the duct 16, the latter leading upwardly on the exterior of the crank case and then transversely thru an opening formed therein to the downwardly extending duct 17. The duct 17 in turn leads downwardly to a distributing head or pipe 18 and the latter has a plurality of branch pipes leading upwardly to the bearings 20 of the crank shaft 21. Thru the medium of these lubricating ducts and the force pump 15, the crank shaft bearings of the motor may be supplied with lubricant in the usual manner.

In the specific embodiment illustrated there are provided two banks of cylinders with six cylinders in each bank, and in a manner similar to the construction of the motor set forth in the above noted application, the water jackets 22 for the cylinders being cast integrally with the upper half of the crank case. In the motor illustrated herein the water jackets are formed in pairs, each pair enclosing a common cooling fluid chamber (Fig. 14) for a pair of cylinders 25. It is a feature of the motor, as set forth above, to have the cylinders immersed or submerged into the water jackets from above and supported independently thereof, there being no mechanical connections or insulating joint between the water jacket and cylinders throughout the piston travel whereby the above noted advantages in construction and operation are obtained. In accordance with this feature of my invention I provide a separate and distinct elongated valve cage 23 for the reception of the individual cylinders, the water jackets 22 being secured in a conventional manner to the valve cage 23, and the individual cylinders 25 being securely anchored directly to the valve cage 23 and maintained in spaced relation with the jackets 22 throughout the length of the piston travel. Each pair of jackets 22 has cast therewith at the upper end a shoulder as a securing means for attachment to the cage 23, this shoulder merging into a web or seat 24 bringing the adjacent pairs. This web 24 not only serves as a seat for the cage but also strengthens and stiffens the jacket and crank case structure. The cylinders 25 are formed with integral heads 26 and are preferably fastened to the cage 23 by means of a screw threaded connection. For this purpose the valve cage is provided with shallow pockets or chambers for the reception of each of the cylinder heads and their pockets are internally screw threaded for co-operation with the externally threaded upper portions of the cylinder. The threaded portions of the cylinders extend downwardly only for a short distance and are expanded as indicated to give the required valve space in the cylinder head for maximum power and speed. The walls of the threaded portion and also the head may be of a slightly thicker and heavier construction than the remainder of the cylinders. The valve cage is provided with an ample cooling chamber or space 28 for the circulation therethru of a suitable cooling or heat absorbing fluid. Communication is established and maintained between the water jacket chamber and this valve cage chamber by means of openings 29 cast or otherwise formed in the valve cage. This construction forms a three-part assembly comprising the water jackets and the crank case, the valve cage and the individual cylinders, the water jackets and the valve cage being directly connected and secured to each other by bolts 30 and the cylinders being maintained out of engagement with the water jackets and secured directly to the valve cage. These cylinders may be provided with radiating flanges 31 around the exterior thereof which also promote the transfer of heat energy. These cylinders are also provided adjacent their lower ends with external cylindrical flanges 32 which cooperate with similar flanges 33 on the interior of the water jackets, together with suitable packing therebetween, to seal the water jackets or chambers from the interior of the crank case and against the entry of oil thereinto. By this construction and assembly the cylinder bodies 25 are free from mechanical engagement with the jackets 22 and accordingly are unaffected by the contraction and expansion thereof. The cylinders therefore maintain their cylindrical shape independently of the jackets and bindings between the pistons and the cylinders due to distortion from the cylindrical shape is avoided. The cylinders are free from mechanical engagement with their supports throughout the piston travel, only the clearance space or combustion chamber of the cylinders being attached to the valve cage. The combustion chamber walls including the head 26 may therefore be made as thick as required to form a rigid connection with the support or cage without a corresponding increase in the bore of the cylinder or corresponding increase in the cylinder walls. Furthermore, the cylinder may be expanded at its upper end and the head 26 may be made just as large as is desired to accommodate the required number of valves therein or value of the required dimensions for the rapid induction and eduction of the gases. Rapid intake and exhaust is especially important in the high speed and high powered engines used on aircraft and this construction enables the provision of the maximum valve space required for this purpose independently of the cylinder bore and thickness of the cylinder bore. A further advantage is that the thrust is transmitted directly to the cylinder head and valve cage the lower end of the cylinder being unattached to the motor frame work, and consequently there being no longitudinal strains set up in the cylinder bodies 25 to cause distortion thereof or cause them to rip at the base.

The motor illustrated is of the valve-in-head type and each cylinder head 26 is provided with a plurality of valve openings therein with the usual valve seats formed around the openings. In the specific embodiment illustrated there are illustrated four valves for each cylinder, one pair of valve openings 34 being the intake valves and the other pair 33 being the exhaust valves. These valves are symmetrically arranged around the center of the cylinder head as is usual in this art. The cylinders are initially formed with their heads slightly beveled or convexed outwardly as is indicated in Fig. 8 and when they are screwed home into the valve cage chambers 27 these convexed heads are caused to flatten out as indicated in Fig. 9, it being understood that the convexity of the cylinder heads need only be slight to accomplish the purpose intended. By means of this construction and assembly a good firm contact is produced between the cylinder head 26 and the valve cage which contributes toward efficiency in cooling. In order to procure a more perfect and firmer contact between the cylinder heads 26 and the valve cage and to maintain such contact under all conditions of service I provide each cylinder head 26, preferably integral therewith, with a tightening stud 36, these studs being conveniently located in the ample space provided in the center of the head 26 by the multiple valve arrangement. These studs 36 in the assembled position of the cylinders project upwardly thru openings 37 formed in the bottom wall of the valve cage and suitable clamping nuts 38 engage the upper ends of the studs 36 for drawing the head 26 securely and tightly against the bottom of the pocket 27. The studs 36 may be reached thru openings formed in alignment with the valve cage and the upper wall of the valve cage, these openings receiving the closing plugs 39. It has been found that this construction affords at all times and during prolonged operating periods a thorough thermal connection between the cylinder heads and the valve cage. Other openings are also formed in the upper wall of the cage which are closed by plugs 39' for affording access to the interior chamber thereof.

As above indicated each valve cage is integrally formed and preferably extends throughout the cylinder jackets of each bank. Above each cylinder this cage is provided with four openings 40 in alignment with the valve openings 34 and 35 for the reception of the guides 41 thru which pass the valve stems 42. Each pair of intake and exhaust valves is provided with a common yoke 43 to which are fixed the valve stems 42. Around the guide openings there are provided cylindrical chambers 44 (cast with the cage) for the reception of the valve actuating springs 45 and 46, these springs being in duplicate and concentrically arranged with respect to each other. The inner valve spring 45 is of smaller dimensions than the outer spring 46 as indicated in Fig. 12 and both of these springs engage at their outer ends a collar 47 which is securely fastened to the upper end of the valve stem 42 whereby the yoke 43 is urged upwardly together with a valve stem 42 until the valves are caused to engage the valve seats. The valve cage 23 is provided with a cylindrical chamber 48 intermediate each set of valve stem guides 41, this chamber 48 being prolonged upwardly by means of a cylindrical member 49 projecting upwardly toward the yoke 43. This serves as a guide chamber for the cylindrical guide 50 fixed to the under side of a yoke 43 intermediate its ends. This construction insures an accurate alignment of the yoke and the cooperating parts. A compression spring 51 may be disposed within the cylindrical guide 50. This spring engages the bottom of the chamber 48 to assist the springs 45 and 46 in urging the yoke and valves upwardly in the path of the actuating cam 52 carried by the cam shaft.

There are provided two cam shafts for each bank of cylinders, one of these cam shafts 53 being disposed above and in alignment with the intake valves and the other cam shaft 54 being similarly arranged with reference to the exhaust valves. By having a separate cam shaft for the intake and exhaust valves the setting and timing of the intake valves may be accomplished independently of the timing of the exhaust valves and vice versa. This contributes to a more accurate adjustment and setting of the valves. These cam shafts 53 and 54 are journalled in a plurality of bearing standards 56, each standard 56 being provided with feet 57 for attachment to the top of the valve cage. The bearings are conveniently secured to the top of the cage by means of screw bolts 58 passing thru the feet 57 and engaging openings formed in the top of the valve cage. Each bracket 56 is transversely arranged with reference to the cam shafts and carries a bearing for each thereof. The bearings are split in a plane coincident with the axes of the shafts and the upper half or cap 59 of the bearing is secured by the standard 56 by means of a pair of bolts 60 on the ends thereof and also by means of a centrally disposed screw bolt 61 as indicated in Fig. 15.

The above described mechanism including the cam shafts is entirely enclosed by means of an elongated casing or hood 63; this casing being preferably of a light material, such for instance as aluminum or alloy. This hood 63 may be secured to the valve cage by means of a plurality of bolts 64 indicated in Figs. 1 and 10. For the purpose of inspection or for other reasons this casing 63 may be provided with inspection openings which receive enclosing plugs 65. The casing is also provided with openings for the reception of the air pump 66, this pump being driven or actuated by an eccentric 67 fixed to the intake cam shaft 53.

The motor illustrated herein is of the geared down type and is adapted to drive a propeller which is mounted on a shaft 70, this propeller shaft 70 being mounted substantially in alignment with the V formed by the two banks of cylinders. This shaft 70 is conveniently geared to the crank shaft 21 by means of a pair of gears 71 and 72, the latter being fixed to a right hand end (Fig. 1) of the crank shaft by means of bolts 73, passing thru cooperating flanges formed integrally of the gear and the shaft. The gear 71 is similarly fixed to the shaft 70 by means of cooperating flanges and bolts 74. For accommodating these reduction gears the upper half of the crank case has cast therein a gear chamber 75, the inner wall of this chamber being indicated at 76, and the outer wall at 77. There is also formed integrally with the crank case and with the walls 76 and 77 a pair of aligned lower bearings 78 and 79 for the reception of a propeller shaft 70, the bearings 78 being the inner bearings and the bearings 79 being for the outer end of the shaft. Similarly there is formed integrally with the walls 76 and 77 a pair of aligned upper bearings for the right hand end of the crank shaft, the inner of these bearings being designated at 80 and the outer at 81. By this construction there ings, the bearings of each pair being separated from each other by the transverse gear chambers 75. The bearings 78 and 79 may be provided with the usual liners 78' and 79' and in like manner the bearings 80 and 81 are provided with liners 80' and 81'. The propeller shaft bearings are split horizontally, the upper halves 78 and 79 and preferably formed integrally (cast) with a bearing cap 82. This bearing cap 82 may thereby be removed together with both of the upper bearings as a unit to permit the insertion of or the removal of the shaft 70 with its gear 71 from an assembled position. The lower half of the bearings for the crank shaft which cooperate with the upper bearings 80 and 81 are indicated at 83 and 84 respectively. These lower bearings 83 and 84 are fixed to the upper half of the crank case by means of bolts 85, one on either side of the shaft, and in like manner the cap 82 with its pair of aligned bearings is fixed to the upper half of the crank case by means of its bolts 86. The cap 82 is also provided with another securing bolt 86' which passes thru a lug formed on the inner end thereof in alignment with the propeller shaft and enters a screw threaded pass formed on the crank case. In order to provide an absolutely rigid structure on the right hand end of the crank casing which carries the propeller stub shaft and the reduction gears, I provide means for attaching the cap 82 directly to the lower bearings 83 and 84. For this purpose there are formed a number of vertical openings thru the cap 82, the bearing supports 78 and 79 and the lower bearings 83 and 84, these openings being in alignment with each other and adapted to receive the clamping bolts 87 and 88. In the specific instance illustrated there are two of each of these bolts and they are provided with screw threaded valves 87' and 88' which engage with similarly threaded openings in the bearings 80 and 81. At the point where the bolts enter the bearings 78 and 79 they are provided with external screw threads for the reception of nuts 89 and 90. These bolts are also provided on their ends with screw threads for the reception of clamping nuts in the usual manner. By this construction the walls forming the reduction gear chamber and the bearings of the crank shaft and the propeller shaft are formed into a rigid structure for securely withstanding the stresses and strains set up in the large torque transmitted between the crank shaft and the propeller shaft, the bolts 87 and 88 transmitting the thrust directly from the bearings of the propeller shaft to the bearings of the crank shaft. The walls 76 and 77 of the reduction gear chamber are provided The feature of forming both the inner and outer bearings of the propeller shaft integral with the crank case insures a perfect alignment of these bearings and their shafts under the most rigid conditions in service and the construction embodying the removable cap 82 simplifies and greatly facilitates the assembly of the shafts and the reduction gears. For instance, either the crank shaft 21 or the propeller shaft may be assembled in a position or removed therefrom independently of the other, it being noted that the propeller shaft 70 together with the reduction gear 71 may be removed from its operative position by simply removing the cap 82, this cap, as heretofore set forth, being secured to the crank case by the bolts 86, 86', 87 and 88. There are also provided the aligning pins 91 for the removable cap 82.

In the usual manner the upper half of the crank case is provided with downwardly extending bearing supports 92 extending throughout the length of the crank shaft, these supports having bearings carried by their lower ends which cooperate with the lower halves of the crank shaft bearings 20. A section of one of the crank shaft bearings complete is illustrated in Fig. 5, these being secured together by two pairs of bolts 93 and 93'. A lubricant duct 94 leads up to the lower half for connection with the branches 19.

Referring to the Figs. 1, 2, 6, and 7, the left hand end of the crank shaft case is provided with a housing 95 which serves both as a closure for the crank case and oil sump and as a casing for enclosing the auxiliary drive mechanisms for the accessories hereinafter set forth. This housing is adapted to fit onto the end of the crank case and may be secured in position by means of a plurality of securing bolts as indicated by the drawings. The housing is preferably formed (as by a casting) in one single piece and comprises an outer plate or main body 96, and a transverse enclosing web 97 which extends around the periphery thereof, the plate 96 tapering in width from a point midway of its length to the lower end. Formed integrally with this housing 95 is a pair of brackets 98 which extend out horizontally and carry the magnetos 99. On its lower end the housing is provided with a securing flange for the reception of a water circulating pump 100, this pump being securely fixed thereto in any convenient manner, as for instance by the securing bolts illustrated. The housing also has enclosed therein a pair of aligned bearing members 101 and 102 (preferably formed integrally therewith). The bearing 102 is adapted to receive a vertically disposed shaft of a cir- The shaft 103 is adapted to be driven from the crank shaft 21 by means of a pair of intermeshing bevelled gears 104, and any convenient means may be provided for coupling the circulating pump shaft in alignment with the vertical shaft 103. This vertical shaft 103 is also provided at its lower end with a bevelled gear 105 which intermeshes with a similar gear 106 on the shaft of the lubricating pump 15. The upper end of the housing 95 is provided with an opening in alignment with the bearings 101 and 102 and is adapted to receive therein a bearing 106 in which is journalled the upper end of the shaft 102. Near the upper end of the housing 95 and on the inner side thereof above the V there is provided an intake 107 whereby the oil sump may be replenished with lubricant supply. The bearing 101 is carried by the vertically disposed web 101' bridging the transverse web 97 and this web 101' is joined to the plate 96 by means of a substantially horizontal rib 97'. Similarly the bearing 102 is formed with an integral shelf or bridge 102' bridging the webs 97. The housing is provided with an opening near the upper end thereof which may be closed by a plate 108.

The system of drive for the various accessories and the propeller is indicated diagrammatically in Fig. 16 wherein, as indicated, a pair of inclined shafts 109 extend upwardly from the upper end of the shaft 103 for driving the cam shaft. A bevelled gear is provided on the upper end of the shaft 103 which meshes with similar gears 110 on the lower ends of the shafts 109. Each shaft 109 is geared directly to an exhaust cam shaft by means of a pair of intermeshing gears 111, the larger of these two gears being directly fixed to the ends of the cam shafts. Each shaft 109 is provided with a shaft housing 112, the lower end thereof being provided with a bearing 113 which fits into a corresponding opening 114 formed in the upper end of the housing 95. The upper end of the housing 112 is enlarged as at 112' to conform in shape to the expanded or enlarged end of the elongated casings 63 which encloses the valve mechanism and carries a bearing for the upper end of the shaft 109 as indicated in Fig. 2. It is noted that the shafts 109 extend upwardly at an angle to the axis of the cylinders (Fig. 2) which has been found to be a very satisfactory arrangement for the drive. Each bevel 110 on the lower end of the shaft 109 may mesh with a bevel 115 which is coupled to the end of the corresponding magneto shafts. The shaft 103 is also provided on its extreme upper end with a bevelled gear 116 for driving an accessory 117 as for instance a tachometer, the housing 95. Each intake cam shaft is driven directly from the exhaust cam shaft by means of a pair of herring bone gears, these gears being split and the halves thereof separated from each other as indicated. The halves of these herring bone gears being denoted respectively by the numerals 118 and 119. By splitting the gears in this manner and separating the halves thereof as indicated, an arrangement is provided which compensates for slight inaccuracies in the alignment of the shaft and gears and therefore avoids the objections to the use of the rigid spur gear of the non-split herring bone type of gear. In Fig. 17 I have illustrated diagrammatically how this automatic adjustment and compensation takes place. The full lines indicate the position of the shafts and gears when accurately aligned, the axes X—X and Y—Y of the shafts being parallel arranged and disposed in the same plane and the view being taken in the direction of this plane. In this aligned position the shaft and gear on the opposite side are hidden from view, and for purposes of illustration this shaft is imagined to take an unaligned position as indicated in dotted lines, the other shaft being assumed to remain in its former position. The displaced gears are indicated at 118' and 119' respectively, and Y—Y indicate the axis of the displaced shaft, it being understood that the displacement is exaggerated for convenience in illustration. The shafts being axially shiftable with reference to each other, as set forth above, it is apparent that such displacement of the shafts from the aligned position result in a relative axial shifting indicated at M, the extent of this shifting being determined by the lateral displacement of the shafts. This results in the teeth remaining in driving contact notwithstanding imperfect alignment and each of the gears 118 and 119 assumes its share of the load at all times. The line of contact of a single pair of teeth is indicated at N in full line, showing the shafts in perfect alignment, and at N' is indicated the line of contact of one of their teeth when out of alignment. The line of contact N' is shown slightly displaced from the line N for convenience in illustration but it is understood that the lines are coincident. In order to bring out this compensation feature more clearly the shafts are illustrated as rocking relatively to each other about an axis, substantially midway of the gears 118 and 119, which is an approximate indication of what takes place. The gear teeth remain in contact throughout their operative surface, point contacts and the consequent uneven wear being entirely avoided. The helical teeth N N' are illustrated as being cut substantially at 45 forms a very satisfactory drive for the cam shafts in that a smooth and even drive is obtained for actuating the valves under severe service conditions. Furthermore this type of gearing between the two cam shafts insures, as set forth above, the proper axial position of the intake cam shaft at all times since this shaft is held in intermesh with the reversed helical gears on the exhaust cam shaft.

For leading the fuel charges to the intake chambers there are provided the intake manifolds 121, in the specific instance shown there being one intake for each set of three cylinders of a bank. These intakes 121 cooperate with the opposite intakes 121 to carry a duplex carburetor 122 therebetween. Each carburetor of the duplex unit therefore supplies three cylinders, in the specific embodiment illustrated there being two duplex carburetors for the twelve cylinders. Each intake manifold 121 has three pairs of branches 124, the branches of a pair leading to corresponding intake chambers 125 formed in the valve cage and in turn leading to the combination chamber thru the intake valves. The passage leading from the carburetors and including the intake chambers 125 designed with a view to obtaining a free and unobstructed flow of the fuel to the cylinders. The fuel charges are led upwardly from the carburetors thru passages 126 formed in the casing 127 and registering with the intake manifold. The casing 126 is provided with inlet and outlet connections 128 and 129 for the circulation of the cooling water therethru and around the fuel passages 126. Suitable mufflers 130 may be provided for taking care of the exhaust from the engine, these being suitably attached to the exhaust outlets 131 as indicated in Fig. 2.

Double ignition is employed, as is usual in aeronautical motors, each cylinder being provided with two spark plugs 132 for this purpose. These plugs are transversely disposed and pass thru screw threaded openings 133 (Fig. 13) which are cast in the valve cage, the walls of these openings being worked by the cooling fluid circulating in the valve cage chamber 28. The threaded portions of the cylinders are provided with openings registering with the passages 133 whereby the plugs project into the combustion chambers.

Each bank of cylinders is provided with a tapered water manifold 135 which has branches 135 leading thru passages formed in the intake manifold 121, these passages being formed in bosses or bridges between the branch intakes 124. The branches 135 and the connecting passages thru the intake jackets each pair is provided tion 137 and these connections 137 are in turn in communication with the bottom water manifold 138. It is understood that these manifolds are to be properly connected with the water circulating pump and the radiator (not shown). As above indicated the lubrication is obtained by forced lubrication by the pump 15. The crank shaft is hollow and is provided with the lubricant supply ducts 141 leading from the shaft bearing 20 to the connecting rod bearings 142. The bearings 80 and 81 and the propeller shaft bearings are provided with communicating ducts 143 (Fig. 1) which supply the propeller shaft bearings with lubricant. A duct 144 leads downwardly from the propeller bearings and has its outlet playing on the peripheries of the gears 71 and 72 at their point of engagement whereby the reduction gears are kept well lubricated. An intake or breathing tube 145 may be provided in the removable cap 182.

In accordance with the requirements of the patent statutes I have set forth in the specific manner required thereby one complete embodiment of my motor but it is understood that my invention is capable of assuming other forms than that illustrated and that the claims hereto annexed are not to be limited to the specific devices shown except as is specifically recited therein, but are to be given a construction commensurate with the scope of the invention due regard being had to a consideration of the prior art.

What is claimed is:

1. In an internal combustion engine, the combination of a cylinder support having a recessed cylinder head seat thereon, a cylinder having an integral head for engagement in said recesses, means for securing said cylinder to said support and a stud formed on the cylinder head for attachment to the cylinder support independently of the supporting means.

2. In an internal combustion engine, the combination of an aluminum cylinder head having a cylinder head pocket and seat therein, a cylinder having an integral head, and a stud formed integrally with the head, means for securely anchoring said cylinder within said pocket, and means for attaching said stud independently to said cylinder head for maintaining thermal contact between the head and said seat.

3. In an internal combustion engine, the combination of an aluminum valve cage having a screw threaded pocket therein for the reception of a cylinder, a cylinder having an integral head and having external screw threads thereon, whereby the same may be screwed home into said screw threadber, and means for securely anchoring said stud to said valve chamber whereby thermal contact is maintained between the valve chamber and the cylinder head for the purpose set forth.

4. In an internal combustion engine, the combination of the cylinder support having a seat thereon for receiving a cylinder head, a cylinder having an integral head and adapted to engage said seat, said head having an integral stud thereon, means for securely attaching said stud to said cylinder support, whereby the cylinder head is maintained in contact with the cylinder support, and water jackets independent of said cylinder, to which the cylinder supports are directly attached.

5. In an internal combustion engine, the combination of a crank case having cylinder water jackets formed integrally therewith, a valve cage adapted to be attached directly to said water jackets, said valve cage having pockets therein for receiving the cylinder heads, cylinders having heads formed integrally therewith and adapted to be anchored in said pockets, said cylinders having studs formed centrally on their heads and means for attaching said studs to said valve cage and drawing the cylinder head tightly against the valve cage for the purpose set forth.

6. In an internal combustion engine, the combination of a crank case having cylinder jackets formed integrally therewith, said jackets having securing flanges on their upper ends, a valve cage having a complementary flange adapted to be secured to said first named flange, said valve cage having a plurality of screw-threaded pockets therein for receiving the cylinder heads, a plurality of cylinders having integral heads thereon and having screw threads on the exterior thereof whereby the cylinders may be individually screwed home into said screw-threaded pockets, said cylinder head having studs formed integrally thereon, and means for attaching said stud to said valve cage and drawing the cylinder head tightly against said valve cage for the purpose set forth.

7. In an internal combustion engine, the combination of a cylinder support having a pocket with a seat therein for receiving a cylinder head, a cylinder having an integral head for attachment to said support, means for anchoring said cylinder head within said pocket, and additional means for maintaining said cylinder head in thermal contact with the cylinder head support for the purpose set forth.

8. In an internal combustion engine, the combination of a cylinder support having a pocket with a seat therein for receiving a cylinder head, a cylinder having an integral head and screw threads on the exterior thereof, whereby the cylinder may be screwed home into said screw-threaded pocket, and means for drawing said cylinder head tightly against the valve chamber and maintaining thermal contact therebetween for the purpose set forth.

9. In an internal combustion engine, the combination of a valve cage having a seat thereon for receiving a cylinder head, a cylinder having an integral head, said head having three or more valve openings distributed around its center and also having a stud formed integrally thereon adjacent to the center, means for anchoring said cylinder against the seat on said valve cage, and means for securely anchoring said stud to said valve cage for the purpose set forth.

10. In an internal combustion engine, the combination of a valve cage having a cylinder head seat thereon and a plurality of valve openings therearound, a cylinder having an integral head and a plurality of openings therein complementary to the openings in said valve cage seat, means for anchoring said cylinder to said valve cage with their openings in register, and additional means for clamping the center of said head to said valve cage, whereby the cylinder head is maintained in thermal engagement with the cylinder head seat.

11. In an internal combustion engine, the combination of a valve cage having a pocket therein and a plurality of valve openings around the bottom of said pocket, a cylinder having an integral head for entering into said pocket, said cylinder head having a plurality of valve openings complementary to the valve openings of the valve cage, means for anchoring said cylinder head within said pocket and additional means for clamping said cylinder head to said valve cage and maintaining the same in thermal contact therewith for the purpose set forth.

12. In an internal combustion engine, the combination of an aluminum valve cage having screw-threaded pockets therein and a plurality of valve openings disposed around the center of each pocket, a plurality of cylinders having integral heads, each head having a plurality of valve openings around its center and complementary to the openings in said valve cage, said cylinders having screw threads on the exterior thereof, whereby the same may be anchored individually into said screw-threaded pockets with their openings in register, and each head having an integral stud projecting upwardly from its center for entering into the corresponding opening in the valve cage, and means for securely clamping said studs to said valve cage and drawing the cylinder heads tightly against the bottoms of the pockets for the purpose set forth.

13. In an internal combustion engine, the combination of an aluminum valve cage having screw-threaded pockets therein and a plurality of valve openings disposed around the center of each pocket, a plurality of cylinders having integral heads, each head having a plurality of valve openings around its center and complementary to the openings in said valve cage, said cylinders having screw threads on the exterior thereof, whereby the same may be anchored individually into said screw-threaded pockets with their openings in register, and each head having an integral stud projecting upwardly from its center for entering into the corresponding opening in the valve cage and drawing the cylinder heads tightly against the bottoms of the pockets for the purpose set forth, a plurality of cooling jackets surrounding said cylinders and adapted to be secured to said valve cage independently thereof.

14. In an internal combustion engine, the combination of an aluminum valve cage having screw-threaded pockets therein and a plurality of valve openings disposed around the center of each pocket, a plurality of cylinders having integral heads, each head having a plurality of valve openings around its center and complementary to the openings in said valve cage, said cylinders having screw threads on the exterior thereof, whereby the same may be anchored individually into said screw-threaded pockets with their openings in register, and each head having an integral stud projecting upwardly from its center for entering into the corresponding opening in the valve cage, and means for securely clamping said studs to said valve cage and drawing the cylinder heads tightly against the bottoms of the pockets for the purpose set forth, and a crank case having a plurality of cooling jackets formed integrally therewith and surrounding said cylinders, and means for independently attaching said valve cage to said cooling jackets for the purpose set forth.

15. In an internal combustion engine, in combination, a crank case, water jackets carried thereby, a valve cage mounted on the top of said jackets, said valve cage having seats thereon for receiving individual cylinder bodies and a plurality of cylinder bodies having integral heads adapted to be clamped against said seats, said cylinder heads being formed with a slight outward convexity for the purpose set forth.

16. In an internal combustion engine, in combination, a crank case, water jackets carried thereby, a valve cage attached to and mounted upon the upper ends of said jackets, said valve cage having cylindrical pockets or chambers in register with said jackets, a plurality of cylinder bodies having their heads formed integrally therewith, said cylinders being formed with their heads slightly convexed outwardly, and means for securely anchoring said cylinder bodies within said pockets and flattening out said convexed head for the purpose set forth.

17. In an internal combustion engine, a cylinder assembly comprising a valve cage, said cage having cylindrical screw threaded pockets or chambers formed therein, and a plurality of cylinder bodies with integral heads slightly convexed outwardly, said cylinders having external screw threads on the upper end thereof whereby they may be screwed home in said screw threaded pockets and their convexed heads flattened out.

In testimony whereof I hereunto affix my signature.

CHARLES B. KIRKHAM.